(12) United States Patent
Vom et al.

(10) Patent No.: US 11,385,452 B2
(45) Date of Patent: Jul. 12, 2022

(54) METHOD AND APPARATUS FOR MICROSCOPY

(71) Applicant: Genea IP Holdings Pty Limited, New South Wales (AU)

(72) Inventors: Eduardo Vom, Victoria (AU); Simon Jonathon Spence, Victoria (AU); Samuel Ross Garland Lanyon, Victoria (AU); Benedict John Stewart-Steele, Victoria (AU)

(73) Assignee: Genea IP Holdings Pty Limited, Sydney (AU)

( * ) Notice: Subject to any disclaimer, the term of this patent is extended or adjusted under 35 U.S.C. 154(b) by 0 days.

(21) Appl. No.: 15/557,177

(22) PCT Filed: Mar. 15, 2016

(86) PCT No.: PCT/AU2016/000089
§ 371 (c)(1),
(2) Date: Sep. 11, 2017

(87) PCT Pub. No.: WO2016/145476
PCT Pub. Date: Sep. 22, 2016

(65) Prior Publication Data
US 2019/0064496 A1 Feb. 28, 2019

(30) Foreign Application Priority Data
Mar. 13, 2015 (AU) ................. 2015900909

(51) Int. Cl.
*G02B 21/12* (2006.01)
*G02B 21/08* (2006.01)
*G01N 21/01* (2006.01)

(52) U.S. Cl.
CPC .......... *G02B 21/125* (2013.01); *G01N 21/01* (2013.01); *G02B 21/084* (2013.01)

(58) Field of Classification Search
CPC .................... G02B 21/125; G02B 21/10–125
See application file for complete search history.

(56) References Cited

U.S. PATENT DOCUMENTS

| | | |
|---|---|---|
| 3,290,311 A | 12/1966 | Cragoe, Jr. et al. |
| 3,857,626 A | 12/1974 | Rosenberger et al. |
| 4,127,318 A | 11/1978 | Determann et al. |
| 4,160,578 A | 7/1979 | Gottlieb et al. |
| 4,291,938 A | 9/1981 | Wagner |

(Continued)

FOREIGN PATENT DOCUMENTS

| | | |
|---|---|---|
| CA | 2812776 A1 | 4/2012 |
| CN | 103517676 A | 1/2014 |

(Continued)

OTHER PUBLICATIONS

English Abstract of AU2011312464 A1, published May 2, 2013.

(Continued)

*Primary Examiner* — Robert J Hance
(74) *Attorney, Agent, or Firm* — Sughrue Mion, PLLC

(57) ABSTRACT

The present invention provides for assessing biological samples for developmental viability utilising microscopy by contemporaneously capturing bright field and dark field images of a biological sample within a time lapse measurement interval.

11 Claims, 7 Drawing Sheets

(56) References Cited

U.S. PATENT DOCUMENTS

| | | | | |
|---|---|---|---|---|
| 4,487,486 | A | * | 12/1984 | Hayasaka ............ G02B 21/082 |
| | | | | 359/387 |
| 4,585,315 | A | | 4/1986 | Sincerbox et al. |
| 4,626,079 | A | | 12/1986 | Nakamura et al. |
| 4,852,985 | A | | 8/1989 | Fujihara et al. |
| 4,881,802 | A | | 11/1989 | Stankewitz |
| 5,325,231 | A | * | 6/1994 | Tamura ................ G02B 21/088 |
| | | | | 359/387 |
| 5,820,250 | A | | 10/1998 | Betts et al. |
| 6,259,557 | B1 | | 7/2001 | Miyashita et al. |
| 6,633,375 | B1 | * | 10/2003 | Veith ................. G01N 21/9501 |
| | | | | 382/145 |
| 6,865,013 | B2 | | 3/2005 | Vodyanoy et al. |
| 6,870,949 | B2 | * | 3/2005 | Baldwin ............ G01N 21/8806 |
| | | | | 356/600 |
| 7,271,889 | B2 | | 9/2007 | Cemic et al. |
| 7,542,203 | B2 | | 6/2009 | Vodyanoy et al. |
| 7,564,623 | B2 | | 7/2009 | Vodyanoy et al. |
| 7,823,783 | B2 | | 11/2010 | Gerst, III et al. |
| 7,832,894 | B2 | | 11/2010 | Rudolph et al. |
| 8,243,134 | B2 | | 8/2012 | Mizuta et al. |
| 2003/0156280 | A1 | * | 8/2003 | Reinhorn ............ G02B 21/125 |
| | | | | 438/16 |
| 2005/0117144 | A1 | * | 6/2005 | Greenway .............. G01N 21/81 |
| | | | | 356/30 |
| 2007/0147821 | A1 | * | 6/2007 | Gaessler ................ G01N 21/55 |
| | | | | 396/155 |
| 2009/0034248 | A1 | * | 2/2009 | Rudolph .................... F21K 9/00 |
| | | | | 362/230 |
| 2009/0225414 | A1 | | 9/2009 | Heiden et al. |
| 2010/0073935 | A1 | * | 3/2010 | Ben-Ezer ............ G02B 21/10 |
| | | | | 362/311.12 |
| 2011/0157692 | A1 | | 6/2011 | Lin et al. |
| 2013/0038859 | A1 | | 2/2013 | Verboven et al. |
| 2013/0044202 | A1 | * | 2/2013 | Kajiro ................. G02B 21/368 |
| | | | | 348/79 |
| 2013/0077159 | A1 | | 3/2013 | Tani |
| 2013/0094078 | A1 | | 4/2013 | Weiss |
| 2013/0225431 | A1 | | 8/2013 | Chavez et al. |
| 2013/0335976 | A1 | | 12/2013 | Ben-Ezer |
| 2014/0106389 | A1 | * | 4/2014 | Loewke ........... G01N 35/00584 |
| | | | | 435/286.2 |
| 2014/0220618 | A1 | | 8/2014 | Wirka et al. |
| 2014/0313577 | A1 | | 10/2014 | Tandler et al. |
| 2016/0363753 | A1 | * | 12/2016 | Todd ..................... F21V 23/003 |

FOREIGN PATENT DOCUMENTS

| | | | | |
|---|---|---|---|---|
| DE | 2542075 | A1 | | 7/1977 |
| EP | 0504940 | A2 | | 9/1992 |
| EP | 0935747 | B1 | | 7/2003 |
| EP | 1486812 | B1 | | 3/2009 |
| EP | 1621911 | B1 | | 6/2010 |
| EP | 2402813 | A2 | * | 1/2012 ........... G02B 21/125 |
| FR | 2325065 | A1 | | 4/1977 |
| GB | 1493099 | A | | 11/1977 |
| JP | 52-40149 | A | | 3/1977 |
| JP | 2009-63856 | A | | 3/2009 |
| JP | 2010156558 | A | * | 7/2010 |
| JP | 2014-504849 | A | | 2/2014 |
| WO | WO-2005098515 | A1 | * | 10/2005 ........... G02B 21/125 |
| WO | 2011/025736 | A1 | | 3/2011 |
| WO | 2012/047678 | A2 | | 4/2012 |
| WO | 2014/131091 | A1 | | 9/2014 |

OTHER PUBLICATIONS

English Abstract of AU2011312464 B2, published May 19, 2016.
Tone Jarvis-Mack, "Auxogyn's non-invasive Early Embryo Viability Assessment Test (Eeva)", Retrieved from the Internet, URL: https://www.fertilityroad.com/fertility/assisted-conception-ivf/auxogyns-non-invasive-early-embryo-viability-assessment-test-eeva-8084/ (2 pages total).
English abstract of CN203799106 U, published Aug. 27, 2014.
English Abstract of TW244398 B, published Apr. 1, 1995.
International Search Report of PCT/AU2016/000089 dated Jun. 21, 2016 [PCT/ISA/210].
Written Opinion of PCT/AU2016/000089 dated Jun. 21, 2016 [PCT/ISA/237].

* cited by examiner

METHOD AND APPARATUS FOR MICROSCOPY

CROSS REFERENCE TO RELATED APPLICATIONS

This application is a National Stage of International Application No. PCT/AU2016/000089, filed Mar. 15, 2016, claiming priority based on Australian Patent Application No. 2015900909, filed Mar. 13, 2015, the contents of all of which are incorporated herein by reference in their entirety.

FIELD OF INVENTION

The present invention relates to the field of clinical testing and assessment of biological samples using microscopy. In particular, the invention relates to use of dark and bright field microscopy in assessing biological samples. It will be convenient to hereinafter describe the invention in relation to a method and device which may be used to record or observe embryos during their development, however it should be appreciated that the present invention is not limited to that use, only.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

In simple terms, as found in the common reference of Wikipedia[1], bright-field microscopy is the simplest of all the optical microscopy illumination techniques. Sample illumination is transmitted, for example, white light illuminated from below and observed from above, and contrast in the sample is caused by absorbance of some of the transmitted light in dense areas of the sample. Bright-field microscopy may be considered the simplest of a range of techniques used for illumination of samples in light microscopes and its simplicity makes it a popular technique. The typical appearance of a bright-field microscopy image is a dark sample on a bright background, hence the name, "bright field".

[1]http://en.wikipedia.org/wiki/Bright-field_microscopy

Dark field microscopy or 'dark ground microscopy', as also found in its reference under Wikipedia[2], describes microscopy methods, in both light and electron microscopy, which exclude the unscattered beam from the image. As a result, the field around the specimen or in other words where there is no specimen to scatter the beam, is generally dark.

[2]http://en.wikipedia.org/wiki/Dark_field_microscopy

FIG. 1 is a diagram that gives a schematic comparison between the components of bright field and dark field microscopy as generally understood in the prior art[3]. The difference in illumination (shown by stippled shading) of the sample between a bright field optical arrangement and dark field optical arrangement is emphasized in FIG. 1. Dark field in the left hand side exploded view utilizes a dark field stop 001 illustrated by the "spider stop" placed below the condenser 002. The stop 001 blocks the centre of the beam of light to produce a hollow cone of light 003. This light does not directly enter the objective lens 004. Only light that is scattered by the sample and enters the objective lens is seen as an image in dark field. In contrast, the right hand side exploded view of FIG. 1 shows a solid cone of light 005, which illuminates and enters the objective lens 004 in bright field.

[3]http://public.wsu.edu/~omoto/papers/Fig1.html

Conventionally, bright field microscopy is applicable for viewing live or stained cells and this entails a simple setup with very little preparation required. However, biological samples are often low contrast with little natural pigmentation, so samples usually need to be stained and staining may destroy or introduce artefacts. Furthermore, resolution may be restricted to about 0.2 µm. On the other hand, dark-field microscopy is usually applicable for viewing live, unstained samples. This may also require only simple setup for the appropriate dark field optical arrangement and, advantageously provides contrast to unstained tissues so living cells can be observed. However, the tissue may need to be strongly illuminated, which may damage delicate samples.

Another known technique of Phase-contrast microscopy is most useful for observing transparent, unstained, live cells. Phase contrast imaging provides superior images to bright-field optics and fine details which are invisible under bright-field optics show up in high contrast. However, Phase Contrast imaging is not ideal for thick samples that may appear distorted with this technique producing 'Halo effects' or 'phase artefacts', which may become present distorting details around the perimeter of the sample.

There are advantages to dark field microscopy. In this respect, a dark field microscope is ideal for viewing objects that are unstained, transparent and absorb little or no light. As a result, these specimens often have similar refractive indices as their surroundings, making them hard to distinguish with other illumination techniques. Dark field imaging can be used to study marine organisms such as algae and plankton, diatoms, insects, fibers, hairs, yeast and protozoa as well as some minerals and crystals, thin polymers and some ceramics. Dark field imaging can also be used in the research of live bacterium, as well as mounted cells and tissues. It is a technique more useful in examining external details, such as outlines, edges, grain boundaries and surface defects than internal structure. Dark field microscopy is often dismissed for more modern observation techniques such as phase contrast and DIC (Differential Interference Contrast), which provide more accurate, higher contrasted images and can be used to observe a greater number of specimens. However, as noted above, these techniques have their own disadvantages such as for example distortion as mentioned above. Recently, dark field microscopy has regained some of its popularity and when combined with other illumination techniques, such as fluorescence, widens its possible employment in certain fields.

Whilst a dark field microscope can result in beautiful and amazing images; this technique also comes with a number of disadvantages. Firstly, dark field images are prone to degradation, distortion and inaccuracies. Thus, a specimen that is not thin enough or its density differs across the slide, may appear to have artefacts throughout the image. The preparation and quality of the slides can grossly affect the contrast and accuracy of a dark field image so it is important to take special care that the slide, stage, nose and light source are free from small particles such as dust, as these will appear as part of the image. Similarly, if there is a need to use oil or water on the condenser and/or slide, it is almost impossible to avoid all air bubbles. These liquid bubbles will cause image degradation, flare and distortion and even decrease the contrast and details of the specimen. Dark field also needs an intense amount of light to work and, this coupled with the fact that it relies exclusively on scattered light rays, can cause glare and distortion. Dark field may not therefore be a reliable tool to obtain accurate measurements of specimens. Finally, numerous problems can arise when adapting and using a dark field microscope. For example, the amount and intensity of light, the position, size and placement of the condenser and stop need to be correct to avoid any aberrations. Nonetheless, dark field has many applications and is a very good observation tool, especially when used in conjunction with other techniques. However, when employing this technique as part of a research study, the limitations and knowledge of possible unwanted artefacts need to be taken into consideration.

With regard to recording or observing biological specimens, more particularly, embryos during morphology/development, optical wavelength microscopy is suitable for this use, but a separate system set up including optical arrangement is ordinarily required for each of bright or dark field imaging. The illumination methods are generally required to be independent and isolated from each other. Dark field microscopy requires that the area behind the specimen is not illuminated, but light to be shown through the specimen/object is required for viewing. For bright field observation the light is shown directly behind the specimen and the direct light beam is focused on the specimen/object. Dark field illumination may be created with a conical/ring beam of light which intersects at the specimen/object viewed through a microscope positioned on the other side of the specimen bed to the light source.

One known microscopy system for biological samples is provided by Auxogyn, Inc. The Auxogyn, Inc. system has succeeded in providing clear imaging with no obstructions close to the observed/recorded specimen. However, there are drawbacks to the Auxogyn, Inc. system in that it is a large unit, which is not customizable to the design of other modular units available to the market and, the cost of the Auxogyn, Inc. system is quite high in comparison with other custom designed units. Further, whilst the Auxogyn, Inc. system may obtain good clear images which provide clean and crisp imaging of the embryos, in configuration with custom culture dish variations there may be inadequate illumination of all the wells on a given culturing dish design. FIG. 9 is an illustration of the Auxogyn system superimposed upon a commercially available sample module being an independently accessible sample culture module of the present applicant. FIG. 12 is a similar illustration superimposing the Auxogyn, Inc. system over the applicant's module with an allowable envelope for optics overlaid in this illustration for comparison with the oversized form factor evident of the Auxogyn, Inc. system. The image in FIG. 12 shows the Auxogyn, Inc. module in the required position on the applicant's known instrument. As can be seen it is quite large and would have required a significant modification including modifications to the look of the overall module product to accommodate the Auxogyn, Inc. design. As is evident from FIGS. 9 and 12, the Auxogyn, Inc. system does not fit in current instrumentation.

By way of background the sample well imaged in FIG. 10 is not lit well as can be seen by the shadows appearing on both sides of the edges. Therefore there isn't even lighting across all wells. It is considered this is created by the height of the ring of plastic around the culture well within the culture dish. This is exemplary of a currently used culture dish. This image is a micro well within a well within a culture dish.

The image in FIG. 11 shows a well-lit well with no shadows.

Generally speaking in terms of embryo assessment, Auxogyn, Inc.'s non-invasive Early Embryo Viability Assessment Test (Eeva™) may improve in vitro fertilization (IVF) outcomes by providing IVF clinics and patients with objective information on embryo viability. When used with traditional embryo assessment techniques, the Eeva™ system may give IVF clinics and their patients the potential to improve clinical success. With greater opportunity for success, it may be possible to reduce multiple births by enabling single embryo transfer for a large number of patients. The Eeva™ system's proprietary software automatically analyzes embryo development against scientifically and clinically validated cell-division timing parameters. With the Eeva™ system's quantitative data on each embryo's development potential, IVF clinics can optimize the treatment path for their patients undergoing IVF procedures.

Auxogyn, Inc.'s Eeva™ system is designed to fit into routine IVF lab workflow systems. The Eeva™ culture dish contains microwells which enable Eeva™ to track the individual development of each embryo and allow embryos to grow under group culture technique. The dark field Eeva™ microscope fits into most standard IVF incubators and provides automatic dark-field image capture and cell-division tracking without intervention by the embryologist or excessive light exposure to the embryos. The Eeva™ microscope screen fits on the outside of the incubator and allows the embryologist to control each Eeva™ patient session and view the latest images without opening the incubator or disturbing the embryos. Eeva™ automatically analyzes embryo development against scientifically and clinically validated cell-division timing parameters and predicts the future viability of each embryo by Day 2. The quantitative, objective data from Eeva™, in conjunction with standard morphology grading, may enable IVF clinics to make better informed decisions regarding embryo selection and the optimal patient treatment pathway. Using the Eeva™ station, images and videos for each Eeva™ patient session can be easily reviewed. Further, the downloadable reports and videos offered in the Eeva™ system may aid when counseling patients and improve the overall patient experience.

For general reference, the role of time lapse monitoring in embryo selection is discussed in a RB&E article[4] authored by Peter Kovacs, which is incorporated herein by reference and some of the content of that article is reproduced here as follows.

[4] http://www.rbej.com/content/pdf/1477-7827-12-124.pdf Kovacs Reproductive Biology and Endocrinology 2014, 12:124

Various time-lapse systems are currently used. Two of the most widely used technologies, the Primo Vision (Vitrolife™) and Embryoscope (Fertilitech™) systems, both use bright field technology, whereas the EEVA™ (Early Embryonic Viability Assessment, Auxogyn) system, discussed above, uses dark field technology. All systems incorporate a digital inverted microscope that takes a picture of the embryos at 5-20 minute time lapse intervals, where these time intervals are well understood by the person skilled in the art to be time periods commonly used in the field of microscope observation. The images are processed by custom image acquisition techniques and then displayed on a computer screen. The pictures taken at preset or selected intervals are then connected into short films that can be rewound and fast forwarded for detailed analysis.

The EEVA™ system uses dark field illumination, which allows more accurate observations of the blastomere membranes; therefore, divisions can be monitored accurately but the method gives far less information regarding intracellular morphology and has limited ability to follow embryos beyond day 2 with increasing numbers of cells. The automated system could confuse large fragments with blastomeres, which could therefore affect its selection precision. Table 1, below, provides a comparison of these systems.

TABLE 1

Comparison of the technical parameters of three commercially available time-lapse systems

|  | Embryoscope | Primo vision | EEVA |
| --- | --- | --- | --- |
| Illumination | Bright field, low intensity red LED | Bright field, low intensity green LED | Dark field |
| Microscope/incubator | Incubator with integrated time-lapse system | Microscope that can be placed in standard incubators | Microscope that can be placed in standard incubators |
| Culture dish | Embryoslide | 9-16 well Primo vision embryo culture dish | EEVA dish |
| Embryo culture | Single culture | Group culture | Group culture |
| Planes of view | 7 focal planes | 11 focal planes | Single plane |
| Max.# of embryos monitored | 72 | 96 | Depends on the dish |
| Other | Comes with software | Comes with software | Automated, software scores blastocyst formation potential |

Some exemplary known uses for bright and dark field observation follow.

Dark Field Illuminators have generally been used on reflective surfaces to create a stark contrast between the background and specific features, for OCR inspections, or defects such as scratches and packaging tears. Using light to create dark areas may sound like an odd idea, but projecting light at an angle to the surface of an object will cause it to be deflected away from the camera, unless a surface variation causes the light to deflect into the lens. Accordingly, nothing is seen by the vision system if there are no surface aberrations.

Advanced Illumination, Inc. provides a 'combination' bright field/dark field illuminator with their RL5064[5] model. This device has a dual functionality of bright field and dark field illumination in a compact housing where the bright field and dark field can be used independently. However, problems in imaging live cells are evident. In this respect, stained (ie dead) cells can "absorb" light, as amplitude objects but live cells are largely transparent, absorbing almost no light and scattering relatively little. Accordingly, as noted above, dark field images may appear self-luminous like fluorescence images. The design does not use lens to control or focus the light from the LEDs to the specimen. This requires the device to be quite close to the specimen, which is not convenient in a complex system.

[5]http://www.advancedillumination.com/uploads/products/RL5064-A.pdf

It is to be noted that all the systems developed for time-lapse imaging of embryos for the purposes of embryo assessment, as described above, currently rely on only one or the other imaging systems; either bright field or dark field. The advances of bright field in embryo assessment are many and as a result, all known and current embryo morphology descriptions and quality grading systems rely on the use of bright field images. It is and has been the most common method of embryo evaluation under an inverted or stereo-microscope. It also allows observation of intracellular structures (to a degree) and intraembryonic organisation (for example appearance of inner cell mass and trophoectoderm, and a degree and type of cellular fragmentation).

When it comes to observing the morphology and development viability of embryos, there are a number of desirable attributes for a microscopy system. These include the following:

1. Making use of both bright field and dark field microscopy illumination methods to exploit the combined information that can be gained from the respective datasets of both techniques. Bright field illumination is the industry standard for inspection of a biological specimen although the use of dark field illumination allows greater contrast, which provides the information for greater accuracy of an algorithm to detect the edge and highlight the embryo.
2. Commercial and clinical standards would require specifically customized microscopy systems to focus illumination at a specific controlled and repeatable position.
3. From a commercial viewpoint, low cost illumination solutions are highly desirable.
4. It is also highly desirable that microscopy systems are adaptable for both dark and bright field microscopy, preferably without complication in componentry.
5. Whilst two specific light sources may be required for each of dark and bright field illumination, the combination of the two separate light sources into a single componentry, whilst remaining isolated from one another is highly sought after.
6. Space constraints are inevitable so a solution that addresses space constraints is also highly desirable.
7. Providing illumination of a custom dish or biological sample pod geometry.
8. Light wavelength to be embryo safe.
9. Given the nature of microscopy systems for biological samples, it may be a requirement to have thermal management of the microscope lens structure in contact with an otherwise necessarily humid environment.

SUMMARY OF INVENTION

It is an object of the embodiments described herein to overcome or alleviate at least one of the above noted drawbacks of related art systems or to at least provide a useful alternative to related art systems.

In one aspect the present invention provides a method of assessing biological samples for developmental viability utilising microscopy, the method comprising the steps of: contemporaneously capturing bright field and dark field images of a biological sample within a time lapse measurement interval.

Preferably, the step of contemporaneously capturing bright field and dark field images comprises the following steps:
  selectively activating a dark field light source or a bright field light source;
  illuminating a dark field or a bright field light path, respectively, through a composite bright field and dark field lens system;
  capturing time lapse images of dark field or bright field illumination, respectively, of a biological specimen positioned at a focal point of the composite lens system wherein the focal point is common to the dark field light path and the bright field light path.

Preferably, the dark field light source and the bright field light source are in isolation from each other. Preferably, the dark field light path and the bright field light path are in isolation from each other.

Preferably, the isolation is one or a combination of:
optical;
electrical;
thermal.

Preferably, the step of selectively activating a dark field light source or a bright field light source comprises independently controlling the light sources by one or a combination of:
  software control;
  electrical switch control, and;
  mechanical switch control.

Preferably, the method herein further comprises the steps of:
  generating a data set comprising a combination of captured bright field and dark field images from a plurality of time lapse measurements, and;
  selectively displaying one or a combination of captured images from the data set for analysis.

The time lapse measurement interval is about 5 minutes in preferred embodiments.

In another aspect the present invention provides a light path guide for selective bright field or dark field illumination of a biological sample comprising:
  a composite lens system having a first lens for focussing bright field illumination from a bright field light source to form a bright field light path and a second aspherical lens arrangement that is disposed concentrically to the bright field light path for focussing dark field illumination from a dark field light source and enabling contemporaneous capture of bright field and dark field images of the biological sample.

Preferably, the aspherical lens arrangement comprises an annular aspheric lens.

Preferably, the dark field light path and the bright field light path are in isolation from each other.

Preferably, the light path guide further comprises a conic reflector that, in combination with the aspherical lens arrangement, isolates the dark field illumination path from the bright field illumination path.

Preferably a focal point of the composite lens system is common to a focal point of the dark field light path and the bright field light path.

In a further aspect the present invention provides apparatus for assessing biological samples for developmental viability utilising microscopy comprising:
  a composite light source arrangement comprising a bright field light source and a dark field light source wherein the bright field light source and the dark field light source are in isolation from each other; and
  a light path guide as described herein.

Preferably the apparatus further comprises a specimen platform positioned at the focal point of the composite lens system of the light path guide.

Preferably the apparatus further comprises:
  switching means for selectively activating the dark field light source or the bright field light source;
  time lapse measurement means for capturing time lapse images within a time lapse measurement interval of dark field or bright field illumination, respectively, of the biological specimen positioned at a focal point of the composite lens system wherein the focal point is common to the dark field light path and the bright field light path.

Other aspects and preferred forms are disclosed in the specification and/or defined in the appended claims, forming a part of the description of the invention.

The present invention stems from the realisation that whilst there are deficiencies in the prior art with attempts at using both bright and dark field microscopy for observing embryo or more generally biological sample development, nonetheless, combining dark field and bright field observation may allow more information to be obtained given that dark field can detect critical and subtle differences among good morphology embryo to improve embryo selection, also allow for software algorithms, whilst the bright field allows for morphological analysis.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present invention may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

The following description of preferred embodiments of the present invention provides for one or a combination of dark and bright field illumination for imaging of an embryo/biological specimen in a culture dish with sample wells for accommodating a plurality of biological specimens.

Figure 1:
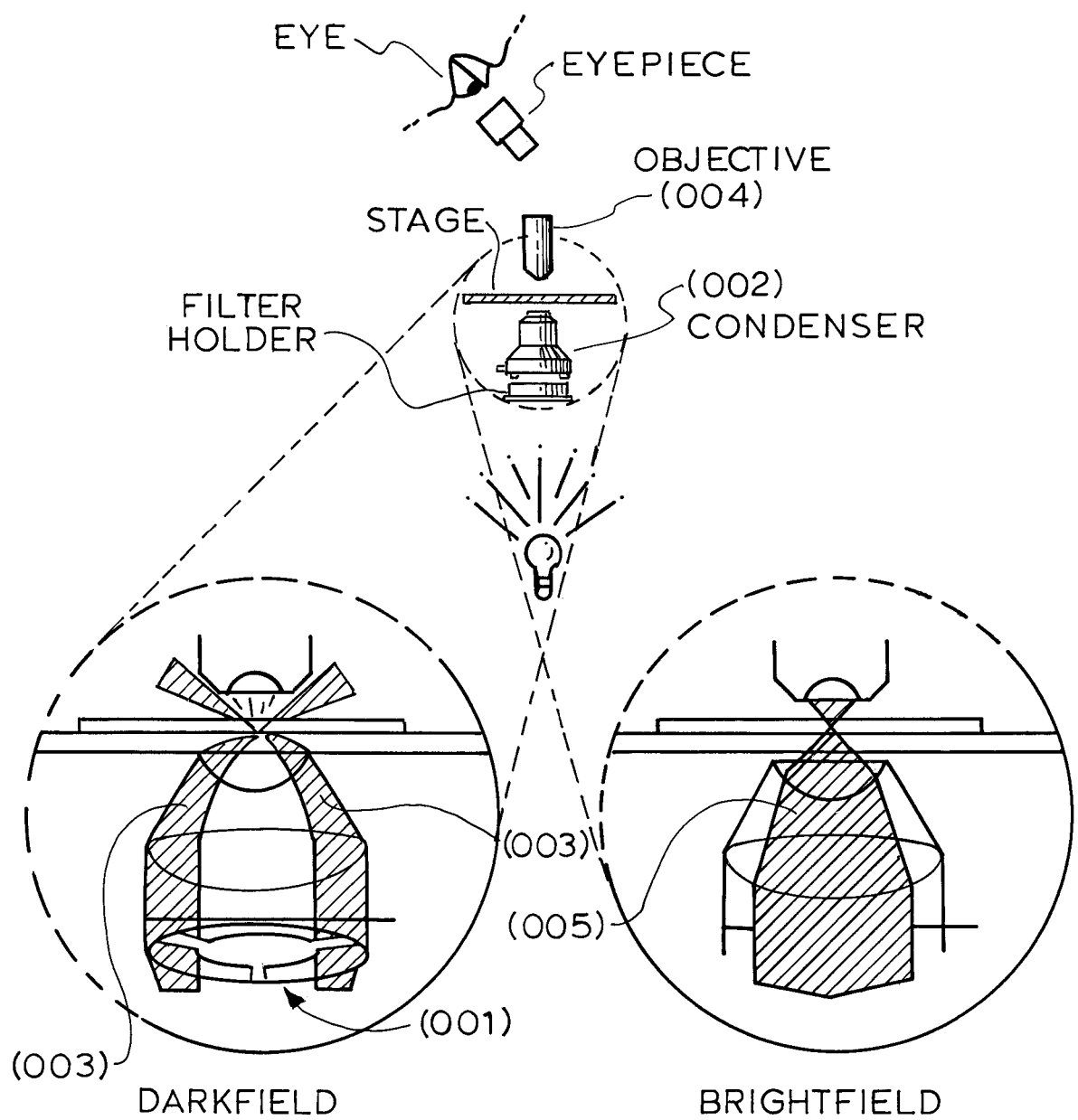
FIG. 1 illustrates a comparison of bright field and dark field illumination for microscopy in accordance with prior art systems.
Figure 2:
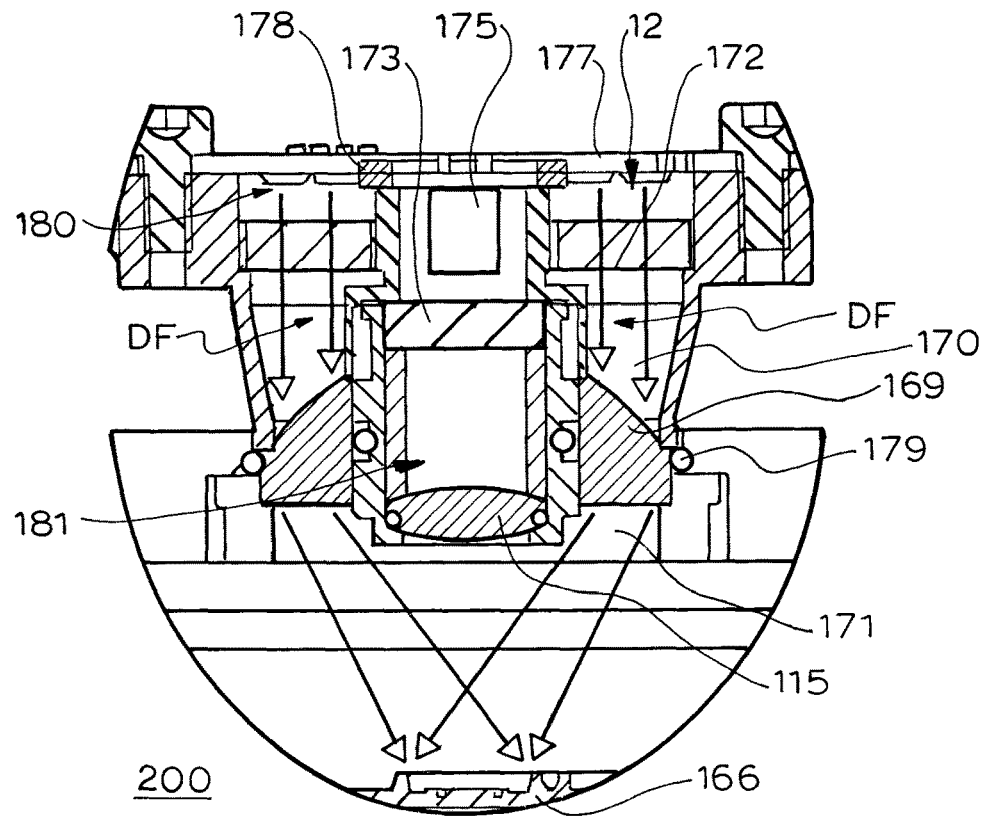
FIG. 2 is a cross sectional view of a microscopy system in accordance with a preferred embodiment of the present invention showing a dark field illumination configuration.
Figure 3:
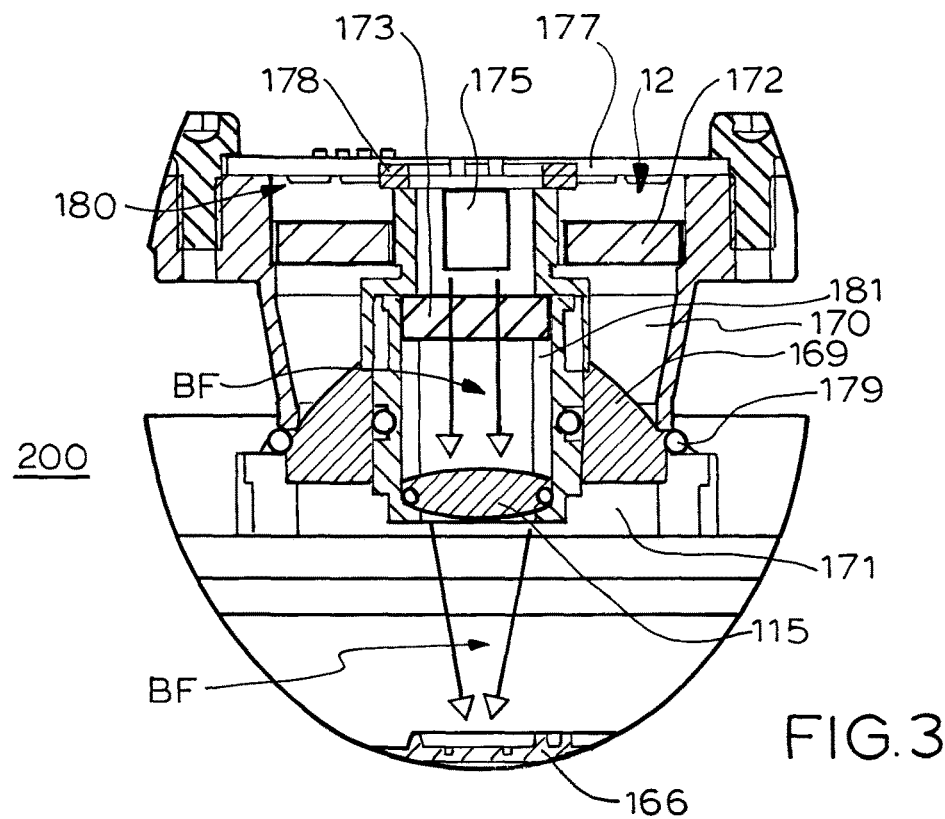
FIG. 3 is a cross sectional view of a microscopy system in accordance with a preferred embodiment of the present invention showing a bright field illumination configuration.

With reference to FIGS. 2 and 3 there is shown a combined dark field and bright field illuminator 200 for use in a time lapse incubator for embryos. The bright field illumination (shown best in FIG. 3 as BF) comprises a light source 175, preferably LED, mounted on a PCA 177, (where 'PCA' is taken to be Printed Circuit Assembly or PCBA Printed Circuit Board Assembly) which is directly above the specimen residing in a culture dish 166. This bright field light beam is contained in the shape of a cylinder to direct a cylinder of light through a lens 115 to converge onto the specimen.

In addition to the benefits from advances in bright field microscopy, the advantages of dark field microscopy in embryo assessment applications reside in its ability to detect external details such as embryo/cell outlines and edges, making it well suited for detecting cell numbers and size and embryo size. Both light and dark field observation types themselves can be and have been used separately to assess embryo developmental potential, but combining them and allowing development and application of algorithms that utilise all information gathered, makes embodiments of the invention an exceptionally powerful tool for IVF clinics. With particular reference to FIG. 2, for dark field illumination a light source 180 mounted on the PCA 177 shines the light parallel to the bright field light beam but without interfering or transgressing the bright field illumination light path.

An Auxogyn, Inc. system module as described in the preamble may be utilised to specifically create the bright field illumination within a preferred microscopy system for the present invention.

In accordance with a preferred embodiment, the dark field illumination source 180 is preferably 42 LEDs in two concentric rings around the bright field illumination source LED 175. Three 2 mm breaks every 120 degrees in this arrangement of LEDs allows for the inclusion of structural ribs for support. This light beam, indicated best in FIG. 2 as DF, is contained on the outside of the collar 181 used for the bright field illumination. This light is also contained by a reflector 170 which is tapered slightly directing the light through an annular aspherical lens assembly 169. This creates an annular light path for the dark field illumination. The lens 169 creates a conical but also annular light beam which is focused on the specimen/object. The dark field is allowed to form in the absence of the bright field illumination LED 175 being powered thus without bright field illumination creating a dark area behind the specimen.

The lenses 115 and 169 are selected specifically for providing a coincident focus plane to provide a focal point for each illumination path upon the biological specimen. Accordingly, the lenses are positioned in the assembly to direct the light paths to a specific location coincident with both bright and dark field cases where the specimen/object will sit.

Lenses 115 and 169 are low cost. In this respect, the center of the dark field aspherical lens assembly 169 has been modified to have approximately a 14 mm diameter hole in the center for the installation of the bright field illumination. The low cost lens configuration and the quantity of lenses instead of multiple lenses allow for a smaller and cheaper componentry creating the same illumination.

The dark field and bright field illumination is created concentrically about the same axis whilst the two separate light beam paths are isolated from one another. Optically the light sources travel in two distinct paths as shown in FIGS. 2 and 3. By physical isolation, light from the dark field area is unable to reach the bright field area. The LED light sources are independent and are able to be individually controlled. The configuration of the light paths are concentric to each other. Software is able to switch from dark field to bright field without a change in focus by the microscope assembly.

The two light sources are located on the same PCA and are isolated from each other preferably by the use of a gasket. Generally a light source is isolated by the use of a gasket as the machined surface of the two components (the PCB and the Machined collar) are not perfectly flat and making them perfectly flat is not cost effective. So a gasket which is a soft foam material may be placed in between to fill the gaps between the two components.

Another way in which this isolation of the two light paths could be done is to pot or fill an electronics assembly with adhesive, which is normally used for corrosion protection and shock protection. An adhesive/filling agent would create a light and air seal, although it would not necessarily be readily reversible and could be a permanent change also not allowing the removal of the two components from each other.

Alternatively, different materials could be used for the gasket between the two components as long as it will not allow light to transfer between the independent focusing assemblies.

In these preferred embodiments the means of isolation shall also not allow air to be transferred between the assemblies.

Separation of the two light sources can also be achieved by placing LEDs onto two separate PCB or PCA which would allow the positioning of the dark field PCA so the light is contained within the collar and the collar has a cap on it and only a small space for some wires to go through to allow power to the LED.

An O-ring could also be used instead of a gasket clamped down against the PCB (generally not used because O-rings may be too hard.). The O-ring is compressed onto the PCB and blocks the sources bleeding light between the dark field light path to the bright field light path which is required to remain dark for the dark field to work. The single PCA allows the component cost to be reduced with both light sources fitted to the same PCB (printed circuit board). Isolation of both bright and dark field light sources may be obtained on one component by use of a gasket placed and compressed by the central support 3 as shown best in FIG. 4, to isolate the bright field light source from the dark field light source. Advantageously, this provides a simple component which allows the use of a single PCA with multiple light sources.

Space constraints of the lens configuration require close placement of the lenses to the specimen bed/dish. The use of the aspherical lens assembly removes the requirement for multiple lenses to converge the light to an appropriate focal point. The use of LEDs which are concentric to one another on the PCB thus on the same axis makes the packaging of the design significantly smaller than a reflecting surface for the dark field illumination with the light path following an additional axis.

The working diameter of the microscope light paths is approximately 14 mm, and degrading illumination within 1 mm on either side of this. This is used to restrict the aspheric lens are key to the clarity of the image produced due to the geometry of the specimen dish. The conical light source is able to be narrow or wide enough to illuminate all the wells in the dish. This is changeable or selectable by the size and shape of conical light beam the shape of the reflector which is a machined component and is able to direct the light into the aspherical lens assembly, During testing several shapes of the cone reflector were tested to create the basic geometry of which is now used. The Internal size found to be most effective was a diameter of about 14 mm and outer diameter to be about 24 mm. The diameter is broken only by structural ribs which allow the bright field lens to be held in position. The three ribs are located at 120 degrees in separation and are about 2 mm thick. With smaller thickness and reduction of the structural ribs this allows the more uniform light cone of the dark field illumination.

It has been found that a specific wave length is less harmful to specimens than others. In this respect, the closer the LED wavelength to 625 nm the less detrimental the illumination is to the specimen. Therefor the LEDs selected are as close to 625 nm as possible.

Thermal management of the lens is required. Due to a connection to the chamber, chamber is the same chamber as described in applicant's published international (PCT) patent specification No. WO 2014/131091, this illumination module is screwed into the wall of the chamber of this then sealed using an O-ring. This O-ring seal is used to seal the humidity of the chamber from leaking to maintain an appropriate humidity range for the embryo, which in part is also temperature, a difference of temperature and humidity across a lens may create condensation on the lens which will create diffraction as the light passes through thus differing the light path. Part of the chamber can be seen in the Cross-section FIGS. 2 and 3. The white space just above the Culture Dish 166. There is a variance in humidity, thus the PCA requires to be sealed from the humidity of the chamber. This seal is created by the use of several O-rings 179. To maintain control the temperature of the lens to not create condensation of the Lens, we are not actively controlling the temperature of the lens by using a heating element, but we have specifically chosen materials which will allow temperature to pass through them to give a gradual change of temperature instead of steep differential. the temperature difference across the lens the surrounding mounting components materials are selected to provide good thermal transfer around the lenses to keep a limited variation in temperature locally.

Figure 6:
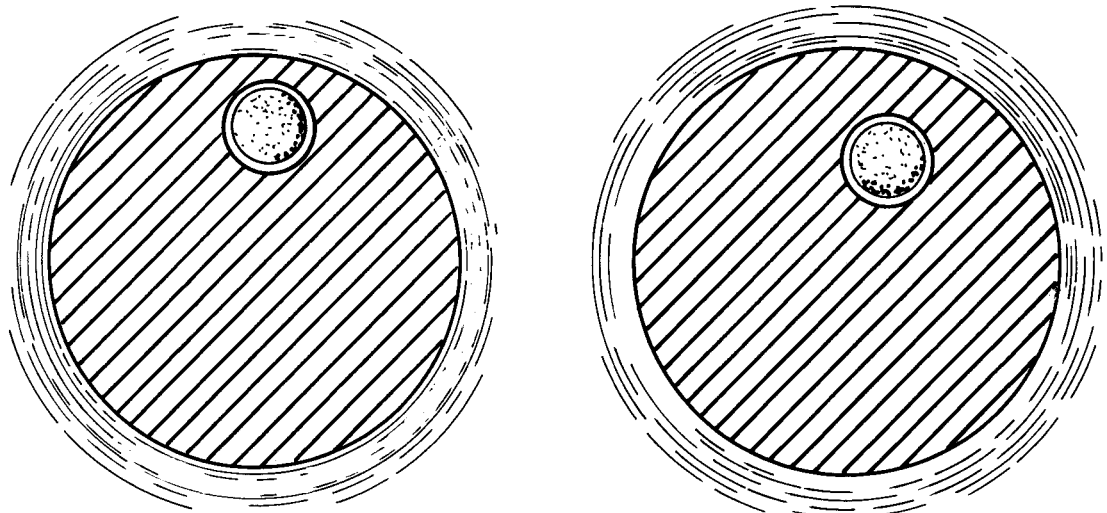
FIG. 6 shows dark field test images from wells 5 and 9 of a culture dish, respectively, of a biological sample taken with the microscopy system of FIGS. 2 and 3 in accordance with a preferred embodiment of the present invention.
Figure 7:
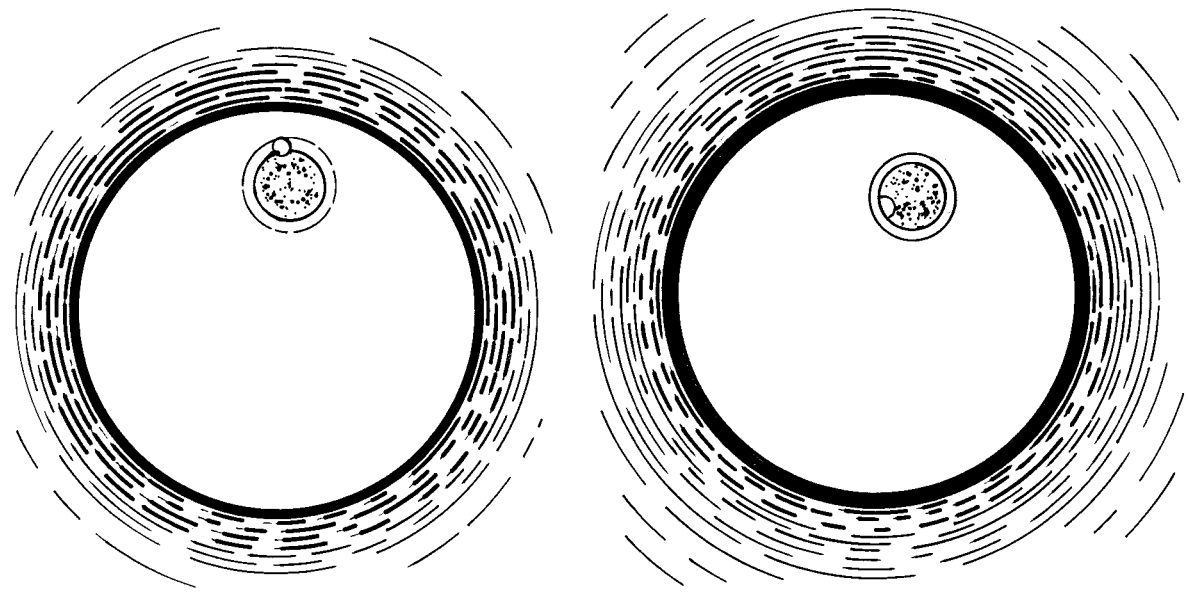
FIG. 7 shows bright field test images from wells 5 and 9 of a culture dish, respectively, of a biological sample taken with the microscopy system of FIGS. 2 and 3 in accordance with a preferred embodiment of the present invention.

Tests were conducted to simulate the illumination of the specimen/embryo in the dish with both bright and dark field illumination. Several concepts of reflecting patterns onto the dish were tested by the use of prototyping reflecting guides toward the aspherical lens assembly. The "guiding" of the light source allows the variations on the geometry of the conical light focused onto the culture dish. Several iterations of prototyping allowed the illumination to be even across all wells in the culture dish. In development of a preferred embodiment, pursuing clarity or shadows and use of early adopted components for example, with iterations of the reflector 171 in testing for proof of concept, allowed the selection of the aspherical lens assembly 169 and an appropriate diameter of the central hole. Within the aspherical lens assembly geometry, a best fit aspheric lens was chosen as an off the shelf component and then a hole was machined into the middle of it to create the bright field light path. This has currently been labelled as BF and used as a path for blocking the light allowing for the dark field measurement. Some test images are shown in the accompanying drawings where FIG. 6 shows dark field images of wells 5 and 9, respectively, of a sample culture dish and FIG. 7 shows bright field images of wells 5 and 9, respectively, of the same culture dish under test.

Illumination of a custom dish geometry is provided with the use of specific light direction and focusing to the specimen around the existing barriers on a custom dish. Specific lenses are used to create the light beam geometry to illuminate all the specimens on the culture dish. Advantageously, this has been specifically customized to the dish geometry to achieve the best illumination result. The custom culture dish geometry that is exemplary in use with preferred embodiments is that disclosed in the applicant's published international (PCT) patent specification No. WO 2014/131091. Another culture dish useful in preferred embodiments of the present invention is that disclosed in applicant's published international (PCT) patent specification No. WO 2014/106286. With use of the culture dish geometry as disclosed in WO 2014/131091 the illumination device is required to be used to illuminate all the micro wells within the one well on the culture dish. As described earlier the Auxogyn, Inc. illumination module is unable to clearly illuminate all of the micro wells in the well on the culture dish. The specific geometry of the dark field illumination was to illuminate all the mirco wells on the dish.

Returning to FIG. 2, a cross-sectional view of an embodiment of the invention is shown and indicates the configuration for dark field illumination. The arrows shown in FIG. 2 represent the path of the light beam in rough estimation. The PCA 177 has the LED attached to the board. The light produced by the LEDs on the board of the PCA 177 is directed through the dark field diffuser 172, which diffuses the light to be more uniform than individual spots emanating from the plurality of dark field source LEDs. The light beam is then guided through the cone outer 170 which guides the light into the surface of the aspherical annular lens assembly 169. This then converges the light to be focused upon the culture dish 166.

FIG. 3 shows the same cross-sectional view of an embodiment of the invention as FIG. 2 with the arrows of FIG. 3 in this instance depicting the light path of the bright field illumination. In the bright field case, the PCA 177 has a single LED mounted centrally which directs the light for the bright field illumination directly above the culture dish and wells containing the specimen. The light is shown and contained within the central cylinder by a light insulator 178 which is clamped against the PCA. The light is directed through the bright field diffuser 173 which diffuses to create a singular spread of light. The light beam is now contained within the collar and is directed through the double convex lens 115 which focuses the light on the culture dish 166.

Figure 4:
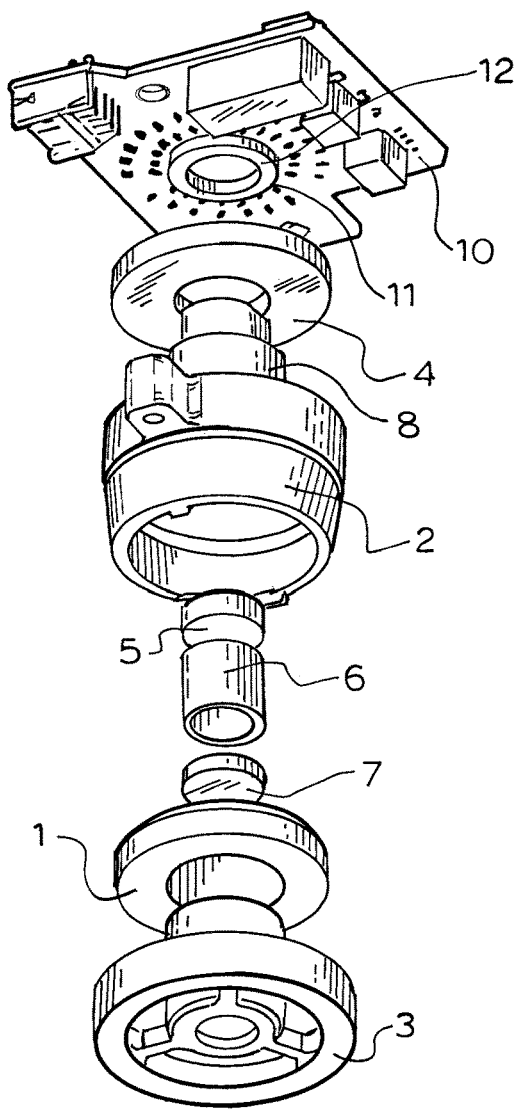
FIG. 4 is an exploded view of the system components of the microscopy system of FIGS. 2 and 3.
Figure 5:
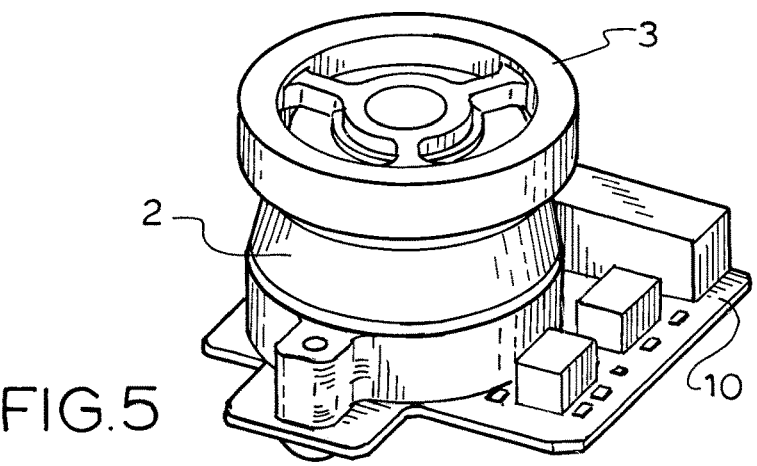
FIG. 5 is the assembled module comprising the components of the exploded view shown in FIG. 4 and is an in situ view of the optics of the embodiment of FIGS. 2, 3 and 4 but from a view that is roughly 180° from the view of FIG. 4.

FIG. 4 shows an exploded view of the assembly of an optical system of the preferred embodiment as shown in FIGS. 2 and 3. In the exploded view of FIG. 4, PCA 177 shows the 42 dark field source LEDs 180 in a circular configuration with three gaps of about 2 mm every 120 degrees which align with the supporting ribs on the centre support 3. It will be appreciated by the person skilled in the art that the disposition of the dark field source LEDs 180 or in fact the bright field source LED/LEDs 175 may be configured in other formations but still provide the illumination suitable for dark field illumination in accordance with embodiments of the present invention.

The cylindrical and concentric design of preferred embodiments having both bright and dark field illumination light sources (175 and 180, respectively) on the same PCA board 177 may be utilised in conjunction with the aspherical lens assembly 169, to provide for the annular light beam to be suitably narrowed and focused on the specimen bed for both types of illumination. This allows a compact design which fits within a very small confined space whilst providing a clear illumination of the specimen on the culture dish. Customized distance to the dish is accommodated by selection of the two lens arrangements to provide the focusing of the light to the specimen bed. The seated position of the lenses is critical to the illumination of the specimen. The seated position is required to be the same distance from the specimen as that of the stated focal length of the lens so the light illuminates the specimen. The focal length is the distance from the lens at which the light is focused. The seated position is another way of stating the exact position, or position of the ledge of which the lens sits upon. The advantage to this is that low cost lenses become available and suitable to allow the illumination of the specimen. In this respect, a low cost illumination solution is provided by way of the PCA 177 in preferred embodiments, which houses both light (bright field and dark field) sources. Furthermore, lenses are preferably made from acrylic to reduce the cost. The compact assembly reduces the size of the lenses required and also the quantity of lenses used to focus the light. So advantageously, both the bright field and the dark field light sources are on the same PCA to alleviate part quantity and cost.

Independent light sources may be controlled to allow switching between the bright and dark field illumination methods through software. Advantageously, No mechanical components are required to move. Further, no filters or blocking components are required to move into place.

The concentric lens and illumination sources arrangement of preferred embodiments allow the system to be packaged in a space constrained area. The concentric illumination source requires that both the bright field and dark field illumination be controlled independently, so as to allow independent capture, view or review of either the dark field or bright field image(s). In the preferred embodiment the use of independent electronic and programmable software control can be used to select each light source independently. By combining the illumination sources and lenses into the same footprint, no mechanical movement is required to select and view either the bright field or dark field images.

In a preferred embodiment the illumination assembly in FIG. 3, is packaged in a vertical height of approximately 26 mm. It will be appreciated by those skilled in the art, the overall design considerations including focal distances, location of the subject specimen, and area of illumination required, lens selection and design could be varied to reduce or increase the size of the assembly. In preferred embodiments components may be specifically designed and selected to illuminate and match the specifics of the overall instrument assembly, microscope, camera and embryo dish. The principal of the combined and geometrically concentric illumination source, lens components, control PCA and software could be varied to suit a wide range of applications outside this preferred embodiment.

Figure 8:
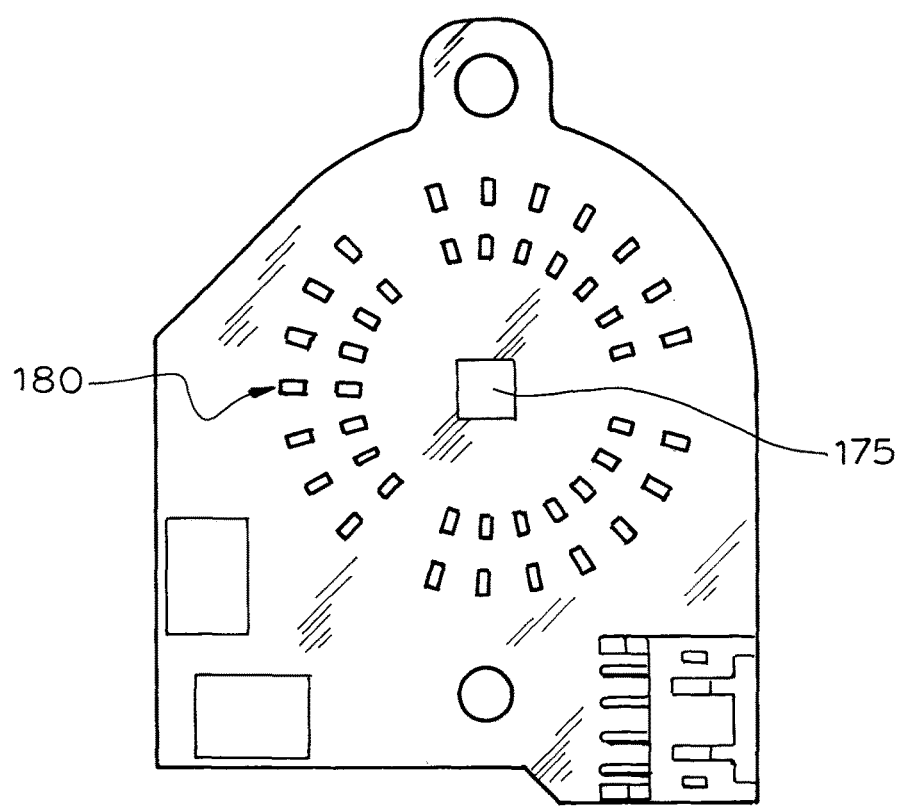
FIG. 8 shows a printed circuit assembly (PCA) for illumination sources comprising concentrically placed LEDs for selective dark field and bright field illumination in accordance with an embodiment of the present invention.
Figure 9:
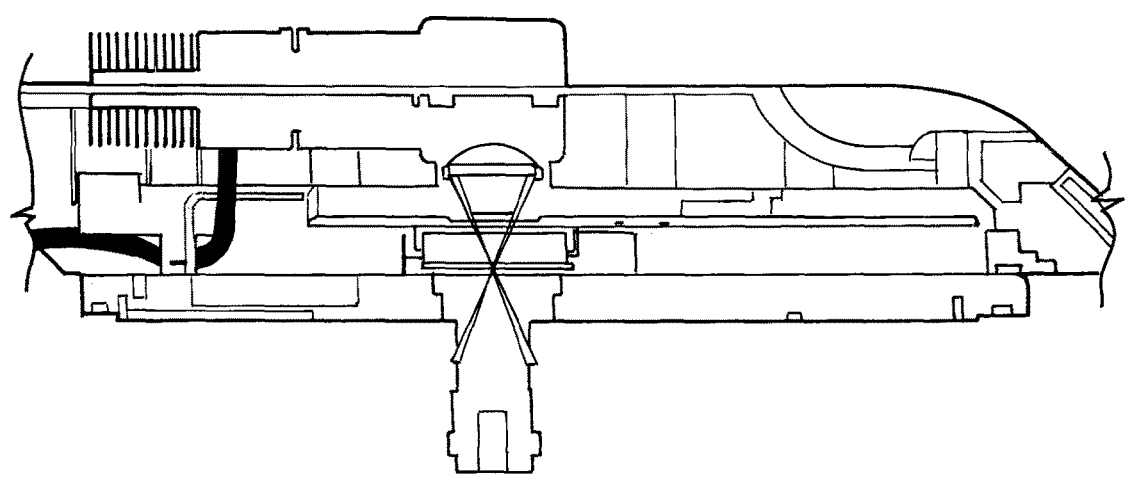
FIG. 9 shows an example prior art dark field illumination module imposed onto a current incubator assembly identifying that it does not fit in known incubator and culturing instrumentation.
Figure 10:
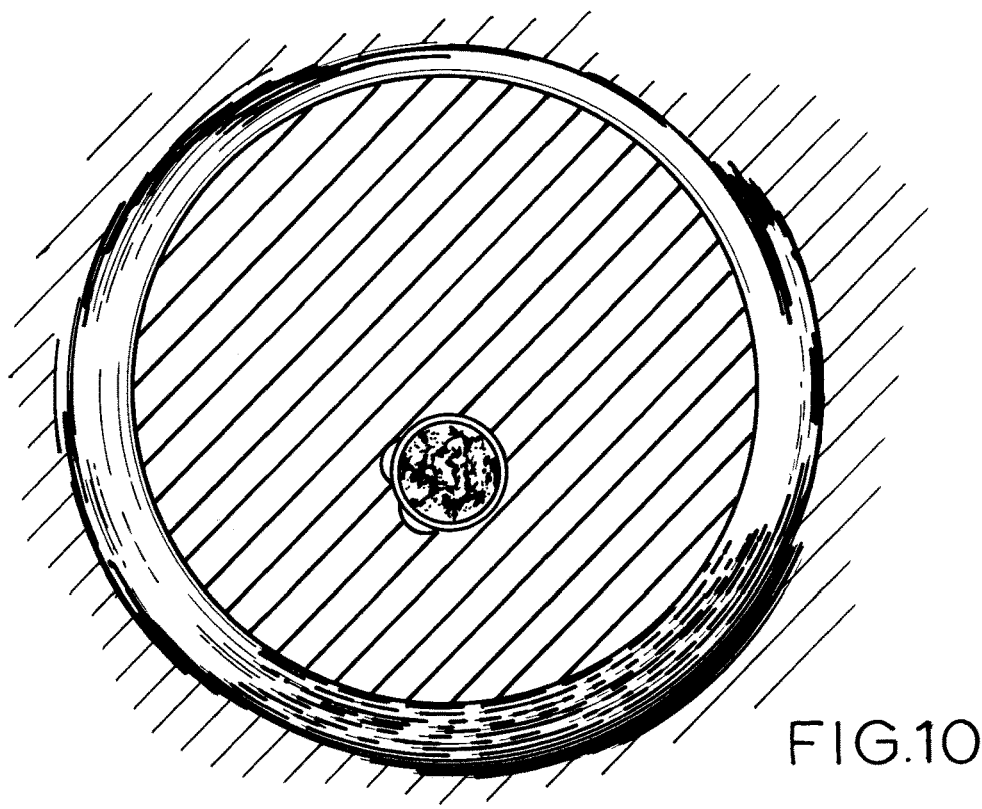
FIG. 10 shows a sample well that is illuminated using a prior art dark field system that provides insufficient image quality, highlighted by the shadows on both sides of the edges.
Figure 11:
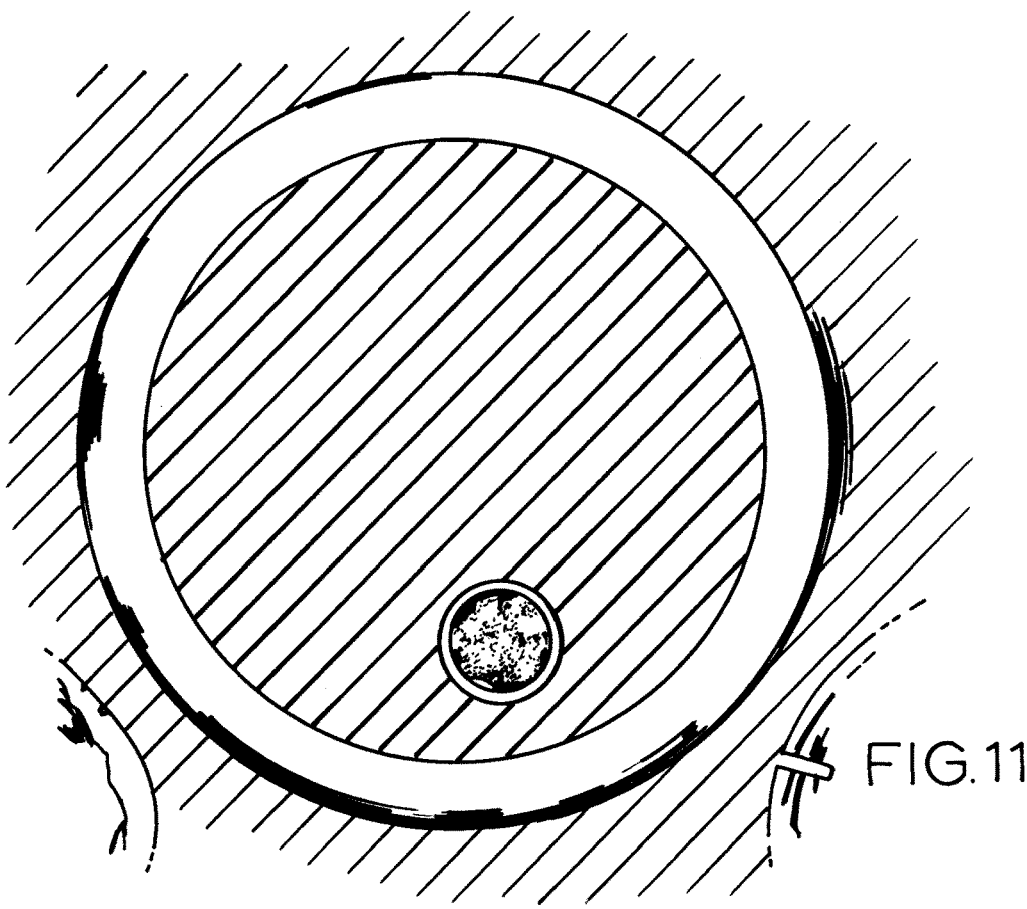
FIG. 11 is an image captured in accordance with a preferred embodiment using dark field illumination that provides sufficient quality for review by a user or an automated algorithm to aid in the assessment of embryo viability.
Figure 12:
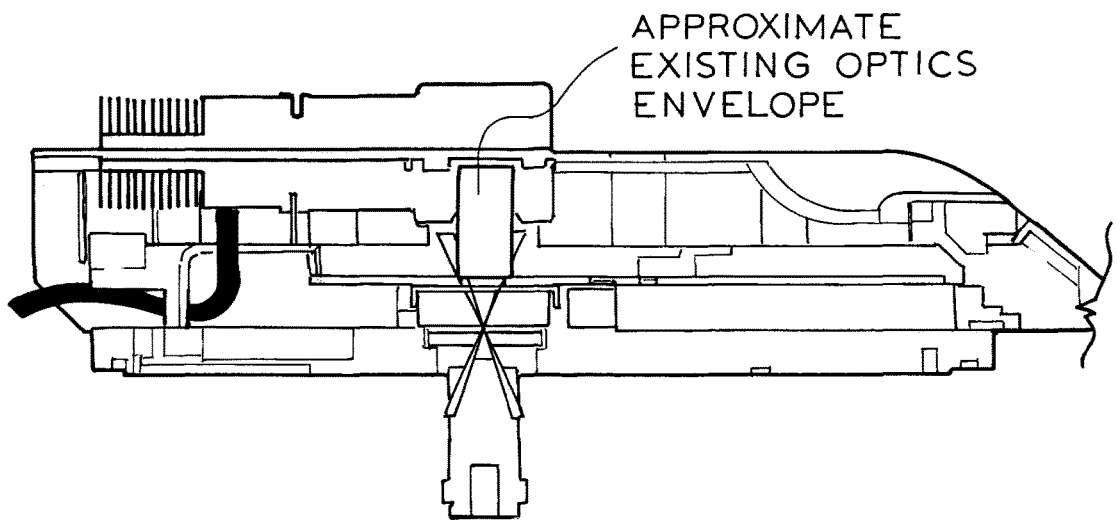
FIG. 12 shows a dark field prior art microscopy module in the required position on a known incubator and culturing instrument. Highlighted in the centre of the dark field illumination source is the bright field illumination space envelope.
Figure 13:
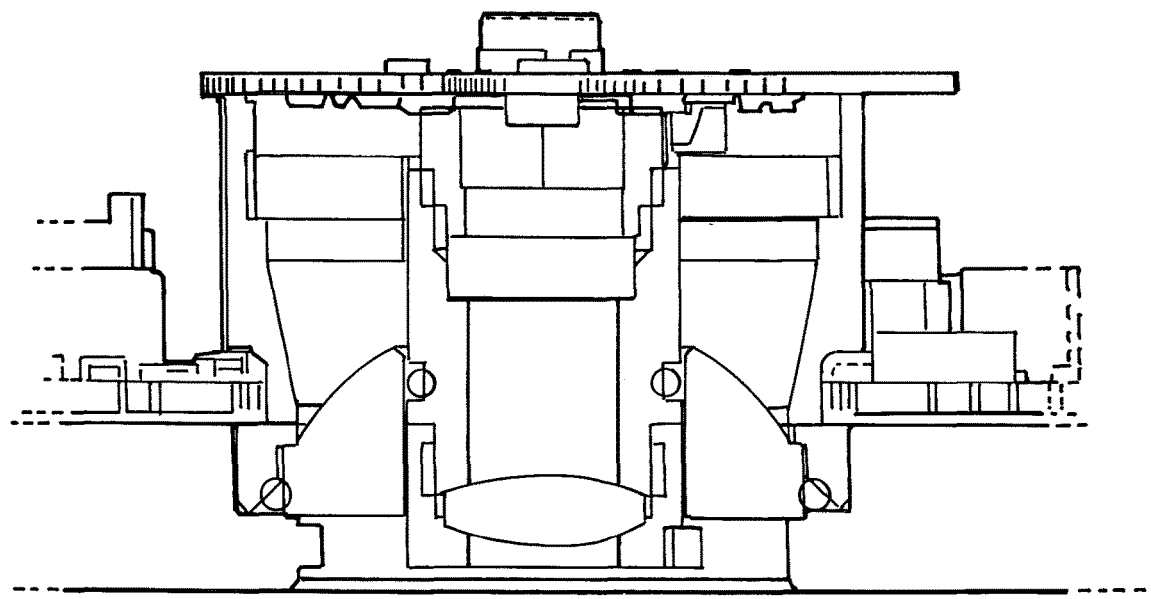
FIG. 13 shows a microscope optical arrangement in accordance with a further embodiment of the invention with alternate sealing options and illustrating assembly processes that encompass similar lens and illumination components.

In a preferred embodiment and with reference to FIG. 8, a single central Light Emitting Diode (LED) 175 is used as the illumination source for the bright field image capture, view or review. The bright field LED 175 is directed into the bright field diffuser 173 and through the bi-convex lens 115. Concentrically around the central LED is an array of LEDs 180, used to create the illumination for the dark field image capture, view or review. The outer ring of LEDs 180 are used to create an even ring of light which in preferred embodiments is passed through the diffuser 172 and into the annular aspherical lens assembly 169.

Time lapse image capture can be performed with the composite dark and bright field microscope lens assembly of preferred embodiments in the same manner as conventional time lapse measurement but with the added benefit of selective switching being capable between dark field illumination of a sample on the one hand and bright field illumination on the other without having to move the sample to the alternate optical arrangement or have time elapse in order to rearrange the optical assembly for the alternate illumination field.

In addition, the fact that both bright field and dark field observations are done practically exactly at the same time (within seconds) and recorded continuously, allows development of advanced algorithms that take into consideration the fast-developing nature of human embryos, when at critical times significant changes can occur within minutes (for example pronuclear membrane breakdown).

In preferred embodiments, a time lapse enabled embryo incubator comprises the following advantageous features:
  a combined dark field/bright field illumination source
  The combination lens assembly and specific structure of the aspheric lens as described above
  Dark field and bright field source have independent control, which may be one of—software, electronic, or mechanical the ability to separate the light sources so as to not allow cross contamination of light the ability to isolate the electronics/optics from the chamber environmental conditions the specific cone design to focus the dark field illumination—describe?

Illumination wavelength specifically chosen to reduce embryo harm

The ring of LEDs for dark field illumination

The automated capture of both bright field and dark field images

The ability to review both bright field and dark field images on said incubator software platform Illuminator position relative to the embryos Selective display of the dark field and bright field images that allows review of both images at essentially the same point in time without requiring manual intervention or removal of embryos from environmentally controlled chamber. Capture and display of both DF/BF allows either user to manually review both images to get a better outcome for the viability of the embryo to be used.

Automated analysis of both bright field and dark field to assist in the selection of the most optimal embryo for implantation.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, Xeon™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A method of assessing biological samples for developmental viability utilising microscopy, the method comprising the steps of:
   capturing bright field and dark field images of a biological sample within a time lapse measurement interval;
   wherein the step of capturing bright field and dark field images comprises the following steps:
   selectively activating a bright field illumination device and a dark field illumination device from a combined illuminator having the dark field illumination device disposed concentrically around the bright field illumination device;
   selectively illuminating a dark field and a bright field light path, respectively, through a composite bright field and dark field lens system of the combined bright field and dark field illuminator, wherein the composite lens system comprises a first lens for focusing bright field illumination from the bright field illumination device to form a bright field light path and a second lens arrangement that is disposed annularly and concentrically around the bright field light path for focusing dark field illumination from the dark field illumination device to form a dark field light path and enabling the capture of bright field and dark field images of the biological sample;
   capturing time lapse images of dark field and bright field illumination, respectively, of the biological sample such that lenses of the composite lens system are selected for providing a coincident focus plane to provide a focal point for each illumination path upon the biological sample.

2. A method as claimed in claim 1 wherein the dark field light source and the bright field light source are in isolation from each other.

3. A method as claimed in claim 1 wherein the dark field light path and the bright field light path are in isolation from each other.

4. A method as claimed in claim 2 wherein the isolation is one or a combination of:
   optical;
   electrical;
   thermal.

5. A method as claimed in claim 3 wherein the isolation is one or a combination of:
   optical;
   electrical;
   thermal.

6. A method as claimed in claim 1 wherein the step of selectively activating a dark field illumination device and a bright field illumination device comprises independently controlling the illumination devices by one or a combination of:
   software control;
   electrical switch control, and;
   mechanical switch control.

7. A method as claimed in claim 1 further comprising the steps of:
   generating a data set comprising a combination of captured bright field and dark field images from a plurality of time lapse measurements, and;
   selectively displaying one or a combination of captured images from the data set for analysis.

8. A method as claimed in claim 1 wherein the time lapse measurement interval is about 5 minutes.

9. Apparatus adapted to incubate biological samples, said apparatus comprising:
   processor means adapted to operate in accordance with a predetermined instruction set,
   said apparatus, in conjunction with said instruction set, being adapted to perform the method steps as claimed in claim 1.

10. A microscopy system adapted for selective bright field and dark field illumination for assessing biological samples for developmental viability, said system comprising:
   a composite lens system having a first lens for focusing bright field illumination from a bright field illumination device to form a bright field light path and a second lens arrangement that is disposed annularly and concentrically to the bright field light path for focusing dark field illumination from a dark field illumination device to form a dark field light path; and the dark field illumination device is disposed concentrically around, and adjacent to the bright field illumination device, wherein lenses of the composite lens system are selected to provide a coincident focus plane for providing a focal point for each illumination path upon the biological sample to enable capture of time lapse images of dark field and bright field illumination, respectively, of the biological sample.

11. The microscopy system as claimed in claim 10 wherein the bright field illumination device and the dark field illumination device form a combined illuminator comprising at least one LED as a bright field light source and at least one LED as a dark field light source arranged concentrically with respect to the bright field light source.

* * * * *